(12) United States Patent  
Stephenson et al.

(10) Patent No.: US 6,704,073 B2
(45) Date of Patent: Mar. 9, 2004

(54) METHOD OF COATING A POLYMER-DISPERSED ELECTRO-OPTICAL FLUID AND SHEETS FORMED THEREBY

(75) Inventors: Stanley W. Stephenson, Spencerport, NY (US); Charles M. Rankin, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/095,379

(22) Filed: Mar. 12, 2002

(65) Prior Publication Data

US 2003/0174264 A1 Sep. 18, 2003

(51) Int. Cl.$^7$ .............................................. G02F 1/1333
(52) U.S. Cl. ....................................................... 349/86
(58) Field of Search ............................. 349/92, 93, 115, 349/188, 8 G

(56) References Cited

U.S. PATENT DOCUMENTS

| | | | |
|---|---|---|---|
| 3,578,844 A | 5/1971 | Kettering et al. | |
| 3,600,060 A | 8/1971 | Kettering et al. | |
| 4,673,255 A | 6/1987 | West et al. | |
| 4,685,771 A * | 8/1987 | West et al. | 349/94 |
| 5,018,840 A * | 5/1991 | Ogawa | 349/89 |
| 5,096,282 A * | 3/1992 | Margerum et al. | 359/3 |
| 5,400,156 A * | 3/1995 | Konuma et al. | 349/92 |
| 5,691,790 A * | 11/1997 | Havens et al. | 349/113 |
| 5,766,694 A * | 6/1998 | West et al. | 427/510 |
| 5,812,227 A * | 9/1998 | Toshida et al. | 349/88 |
| 5,818,557 A * | 10/1998 | Konuma et al. | 349/93 |
| 6,061,107 A | 5/2000 | Yang et al. | |
| 6,108,062 A * | 8/2000 | Takeuchi et al. | 349/88 |
| 6,323,928 B1 | 11/2001 | Petruchik | |
| 6,417,908 B2 * | 7/2002 | Nishiguchi et al. | 349/155 |

FOREIGN PATENT DOCUMENTS

| | | |
|---|---|---|
| EP | 1 116 771 A2 | 7/2001 |
| EP | 1 116 771 A3 | 9/2001 |
| EP | 1 115 026 A2 | 11/2001 |

* cited by examiner

Primary Examiner—Toan Ton
Assistant Examiner—Richard Kim
(74) Attorney, Agent, or Firm—Chris P. Konkol

(57) ABSTRACT

A light modulating layer formed by providing an emulsion having electro-optical fluid in a gelatin solution, heating the emulsion to reduce the viscosity of the emulsion and coating the heated emulsion on a substrate, lowering the temperature of the coated emulsion to change the state of the coated emulsion from a liquid to a gel state, and drying the coating, while in the high viscosity state, to form a layer of polymer-dispersed domains of electro-optical material.

26 Claims, 6 Drawing Sheets

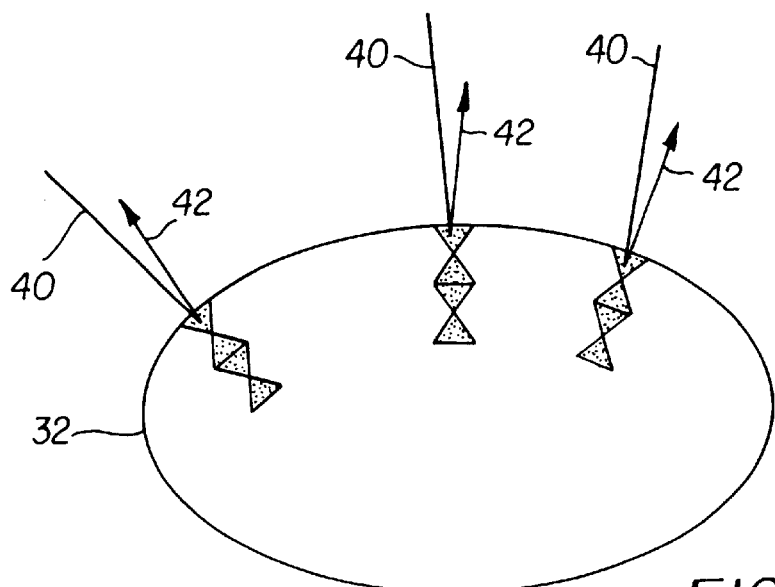
FIG. 2
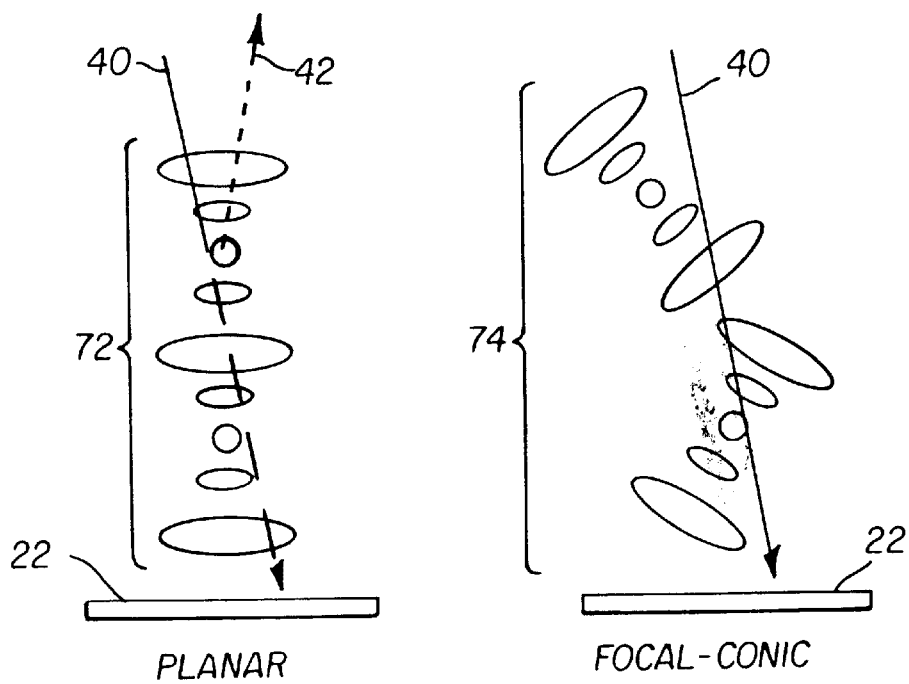
PLANAR
FIG. 3A
FOCAL-CONIC
FIG. 3B

METHOD OF COATING A POLYMER-DISPERSED ELECTRO-OPTICAL FLUID AND SHEETS FORMED THEREBY

FIELD OF THE INVENTION

The present invention relates to the coating of a polymer dispersed electro-optical material. In a preferred embodiment, the electro-optical material is a cholesteric liquid-crystal material.

BACKGROUND OF THE INVENTION

Currently, information is displayed on sheets using permanent inks or displayed on electronically modulated surfaces such as cathode ray displays or liquid crystal displays. Other sheet materials can carry magnetically writable areas to carry ticketing or financial information, however magnetically written data is not visible.

World patent application PCT/WO 97/04398, entitled "Electronic Book With Multiple Display Pages", is a thorough recitation of the art of thin, electronically written sheet display technologies. Disclosed is the assembling of multiple display sheets that are bound into a "book", each sheet provided with means to individually address each page. The patent recites prior art in forming thin, electronically written pages, including flexible sheets, image modulating material formed from a bi-stable liquid crystal system, and thin metallic conductor lines on each page.

An early patent, U.S. Pat. No. 3,578,844, discloses a light modulating structure suitable for a display device. In the patent, cholesteric liquid crystal material is encapsulated by light penetrable gelatin and gum arabic capsules that are coated on a screen. The capsules were formed by emulsifying the cholesteric material in a gelatin solution using a blender to form droplets between 10 and 30 microns in diameter. The pH of the emulsion was changed to precipitate a gelatin coating over each droplet of cholesteric material. The gelatin was hardened and the capsules sieved from the solution. The capsules are then coated over a field-carrying surface to provide an electrically switchable image.

U.S. Pat. No. 3,600,060 to Churchill et al. discloses another process for providing cholesteric liquid crystals in a polymer matrix. The patent discloses emulsifying droplets of liquid crystal in a solution having a dissolved film-forming polymer. The patent further discloses coatings or films having droplets of cholesteric liquid crystal material between 1 and 50 microns in diameter. Suitable binders mentioned in the paper include gelatin, gum arabic, and other water-soluble polymers. Churchill et al. disclose the emulsion can be coated on a substrate, e.g., by means of a draw down applicator to a wet thickness of about 10 mils and air dried at about 25° C. Churchill et al. state that the layers can be dried to touch. In Example 6, 60 grams of cholesteric liquid crystal material is disposed in 100 cubic centimeters of an aqueous polymer solution, polyvinyl alcohol or gelatin, and heated in a WARING blender to 70° C. by a heating jacket to form a desired emulsion, after which the emulsions were coated onto glass previously coated with tin oxide.

Another technique for providing liquid crystal domains in a coating is disclosed in U.S. Pat. No. 4,673,255. A resin polymer is dissolved into a liquid crystal. The resulting solution is induced into a cavity between two conductors. The resin polymer phase separated from the liquid crystal to form microdroplets of the liquid crystal in a polymeric matrix. The phase separation can be thermally induced, solvent induced or polymerization induced to create domains of liquid crystal. These processes, however, require lengthy periods of time to polymerize and phase separate the polymer binder. Organic solvents used in such systems are of environmental concern and are sensitive to processing conditions.

U.S. Pat. No. 6,061,107 reiterates the phase separation technique to form polymer dispersed liquid crystals found in U.S. Pat. No. 4,673,255. The patent discloses that controlling the shape of domains of liquid crystal material in a polymer binder can improve light scattering properties. The patent discloses the use of temperature, solvent and polymer induced phase separation techniques to provide flattened domains of liquid crystal. Such processes are disadvantageous and often require lengthy time periods. When solvents are used, there may be significant environmental concerns.

Published application EP 1 116 771 A2 to Stephenson et al. discloses, in one embodiment, dispersing a liquid crystal material in an aqueous bath containing a water-soluble binder material such as gelatin, along with a quantity of colloidal particles wherein the colloidal particles limit coalescence. The limited coalescent materials were coated over a substrate and dried, wherein the coated material formed a set of uniform limited-coalescence domains having a plurality of electrically responsive optical states.

All of the above-mentioned processes require the manufacture of a liquid crystal display in individual units or on non-flexible substrates or in an environmentally unfriendly manner. This results in liquid crystal displays that are difficult to manufacture or insufficiently economical for wide spread use. There is a need, therefore, for an improved method for making a liquid crystal display or other electro-optical display involving the coating of a dispersed electro-optical fluid on a substrate.

SUMMARY OF THE INVENTION

Accordingly, the need is met according to the present invention by providing a method of making a display having a polymer-dispersed electro-optical fluid, which method includes the steps of:

(a) providing an emulsion comprising an electro-optical fluid, having a plurality of optical states responsive to electric fields, dispersed in a gelatin solution;

(b) heating the emulsion to reduce the viscosity of the emulsion;

(c) forming a coating of the heated emulsion on a substrate having a field carrying layer on its surface;

(d) lowering the temperature of the coating to change the state of the dispersing phase in the coating from a liquid to a gel state characterized by a corresponding increased-viscosity state; and (e) drying the coating, while maintaining it in the increased-viscosity state, to form a coating in which domains of said electro-optical fluid are dispersed in a dried gelatin-containing matrix.

The electro-optical fluid can be a liquid crystal or an electrophoretic material. In a particularly preferred embodiment, the invention relates to the coating of polymer-dispersed liquid crystals comprising the steps of:

(a) providing an emulsion having cholesteric liquid crystal material in a gelatin solution;

(b) heating the emulsion to reduce the viscosity of the emulsion (c) coating the heated emulsion on a substrate;

(d) lowering the temperature of the coated emulsion to change the state of the coated emulsion from a liquid to a gel state, thereby forming a coating characterized by a corresponding increased-viscosity state; and (e) drying the coating, while maintaining it in the high viscosity-state, to form a coating in which domains of polymer dispersed cholesteric liquid crystals are dispersed in a gelatin-containing matrix.

In a preferred embodiment of the invention, the coating is dried, and water is removed, at a rate sufficiently fast to form domains that are flattened to improve reflectance in the reflective optical state of a display in which it is used. Flexible sheets can be made efficiently in accordance with the present invention. High speed, environmentally friendly processes are used. By changing the field applied across the layer, information can be written in the sheet.

BRIEF DESCRIPTION OF THE DRAWINGS

FIG. 2 is a sectional view through a cholesteric liquid crystal domain;

FIG. 3A is a schematic sectional view of a chiral nematic material in a planar state reflecting light;

FIG. 3B is a schematic sectional view of a chiral nematic material in a focal conic state transmitting light;

DETAILED DESCRIPTION OF THE INVENTION

Machine coating processes are disclosed which provide domains of an electro-optical material using a gelatin-based coating material. A coated sheet can be formed by a machine coating process in which the properties of the wet emulsion are controlled as it dries. In one embodiment, machine-coating processes are disclosed which provide cholesteric domains in a gelatin matrix.

A coated sheet can be formed using inexpensive, efficient layering methods. A single large volume of sheet material can be coated and formed into various types of smaller sheets for use in display devices such as transaction cared and the like. Displays in the form of sheets in accordance with the present invention are inexpensive, simple, and fabricated using low-cost processes.

Figure 1:
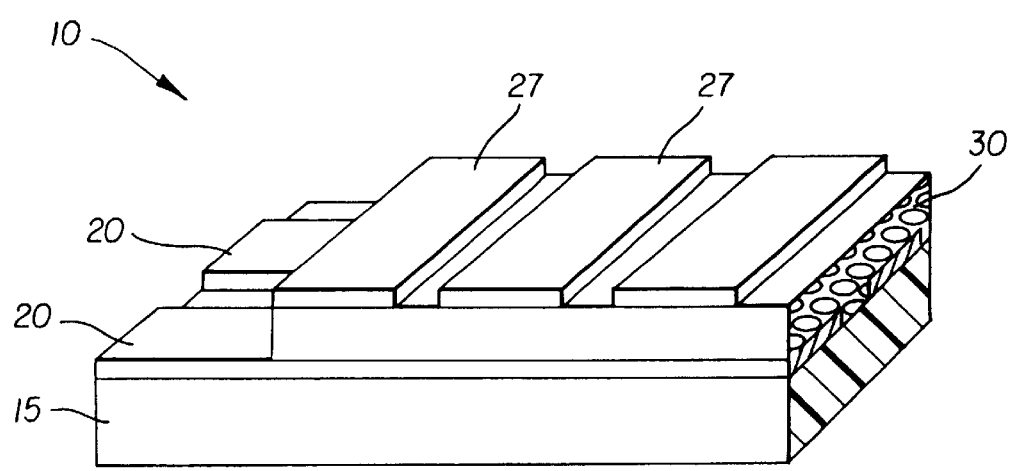
FIG. 1 is a partial perspective of a cholesteric liquid crystal display made in accordance with the present invention.

FIG. 1 is a partial perspective of one embodiment of a sheet 10 made in accordance with the invention. Sheets made in accordance with the present invention have particular applicability when used in displays. Sheet 10 includes a flexible substrate 15, which is a thin transparent polymeric material, such as Kodak ESTAR film base formed of polyester plastic that has a thickness of between 20 and 200 microns. In an exemplary embodiment, substrate 15 can be a 125-micron thick sheet of polyester film base. Other polymers, such as transparent polycarbonate, can also be used. The term substrate, as used in this disclosure, means a structure having one or more layers which receives polymer dispersed liquid crystals in accordance with the present invention.

In the embodiment of FIG. 1, first conductors 20 are formed over substrate 15. Typically, first conductors 20 can be tin-oxide or indium-tin-oxide (ITO), with ITO being the preferred material. Typically the material of first conductors 20 is sputtered as a layer over substrate 15 having a resistance of less than 250 ohms per square. The layer is then patterned to form first conductors 20 in any well-known manner. Alternatively, first conductors 20 can be an opaque electrical conductor material such as copper, aluminum or nickel. If first conductors 20 are opaque metal, the metal can be a metal oxide to provide light absorbing first conductors 20. First conductors 20 are formed in the conductive layer by conventional lithographic or laser etching means.

A polymer dispersed cholesteric layer 30 overlays first conductors 20. Polymer dispersed cholesteric layer 30 includes a polymeric dispersed cholesteric liquid crystal material, such as those disclosed in U.S. Pat. No. 5,695,682, the disclosure of which is incorporated by reference. Application of electrical fields of various intensity and duration can drive a chiral nematic material (cholesteric) into a reflective state, to a transmissive state, or an intermediate state. These materials have the advantage of maintaining a given state indefinitely after the field is removed. Cholesteric liquid crystal materials can be MERCK BL112, BL118 or BL126, available from E. M. Industries of Hawthorne, N.Y.

In the preferred embodiment, polymer dispersed cholesteric layer 30 is E. M. Industries' cholesteric material BL-118 dispersed in deionized photographic gelatin to form an emulsion. The liquid crystal material is dispersed at 8% concentration in a 5% deionized gelatin aqueous solution. The mixture is dispersed to provide domains having an average diameter of 2 to 30 microns, preferably 5 to 15 microns, more preferably about 10-microns, which domains of liquid crystal are dispersed in an aqueous suspension. (These size ranges also apply to the dried coating.) The material is coated over patterned ITO first conductors 20 to provide a polymer dispersed cholesteric coating having a dried thickness of less than 50 microns, preferably less than 25 microns, more preferably less than 15 microns, most preferably less than about 10 microns. Other organic binders such as polyvinyl alcohol (PVA) or polyethylene oxide (PEO) can be used as minor components of the binder in addition to gelatin. Such compounds are machine coatable on equipment associated with photographic films. A conventional surfactant can be added to the emulsion to improve adhesion to first conductors 20. Surfactants can be of conventional design, and are provided at a concentration that corresponds to the critical micelle concentration (CMC) of the solution. A preferred surfactant is a mixture of the sodium salts of di-isopropyl and tri-isopropyl naphthalene sulfonate, commercially available from DuPont, Inc. (Wilmington, Del.) as ALKANOL XC surfactant.

Second conductors 22 overlay polymer dispersed cholesteric layer 30. Second conductors 22 should have sufficient conductivity to carry a field across polymer dispersed cholesteric layer 30. Second conductors 22 can be formed in a vacuum environment using materials such as aluminum, tin, silver, platinum, carbon, tungsten, molybdenum, tin or indium or combinations thereof. The second conductors 22 are as shown in the form of a deposited layer. Oxides of said metals could be used to darken second conductors 22. The metal material can be excited by energy from resistance heating, cathodic arc, electron beam, sputtering, or magnetron excitation. Tin-oxide or indium-tin oxide coatings permit second conductors 22 to be transparent to operate in conjunction with opaque first conductors 20.

In a preferred embodiment, second conductors 22 are printed conductive ink such as ELECTRODAG 423SS screen printable electrical conductive material from Acheson Corporation. Such printed materials are finely divided graphite particles in a thermoplastic resin. The second conductors 22 are formed using printed inks to reduce cost display. The use of a flexible support for substrate 15, layer laser etched first conductors 20, machine coating polymer dispersed cholesteric layer 30, and printing second conductors 22 permit the fabrication of very low cost memory displays. Small displays formed using these methods can be used as electronically rewritable transaction cards for inexpensive, limited rewrite applications. See, for example, commonly assigned, copending application Ser. No. 1008,585, hereby incorporated by reference in its entirety.

FIG. 2 is a cross section through a domain 32 containing a cholesteric material. Domain 32 is spherical, and cholesteric material anchors on the surface of the domain 32. Because the surface of domain 32 is spherical, incident light 40 from any angle of observation can be reflected back as reflected light 42 when sheet 10 is viewed off-axis. The result is that these polymer dispersed (cholesteric) liquid crystals (PDLC) have good off-axis reflectivity.

FIG. 3A and FIG. 3B show two stable states of cholesteric liquid crystals. In FIG. 2A, a relatively high voltage field has been applied and quickly switched to zero potential, which causes the liquid crystal molecules to become planar liquid crystals 72. In FIG. 5B, application of a lower voltage field has caused molecules of the chiral nematic material to break into transparent tilted cells that are known as focal conic liquid crystals 74. Increasing the time duration of a relatively low-voltage pulse progressively molecular orientation from planar state 72 to a fully evolved and transparent focal conic state 74. A typical voltages is about 10 volts/micron of coated material, wherein not more than about 100 volts is necessary to achieve the planar state.

A light absorbing second conductor 22 is positioned on the side opposing the incident light 40. In the fully evolved focal-conic state the cholesteric liquid crystal is transparent, passing incident light 40, which is absorbed by second conductor 22 to provide a black image. Progressive evolution to the focal-conic state causes a viewer to see an initial bright reflected light 40 that transitions to black as the cholesteric material changes from planar state 72 to a fully evolved focal-conic state 74. The transition to the light transmitting state is progressive, and varying the low voltage time permits variable levels of reflection. These variable levels can be mapped out to corresponding gray levels, and when the field is removed, light modulating layer 11 maintains a given optical state indefinitely. The states are more fully discussed in U.S. Pat. No. 5,437,811.

Figure 4:
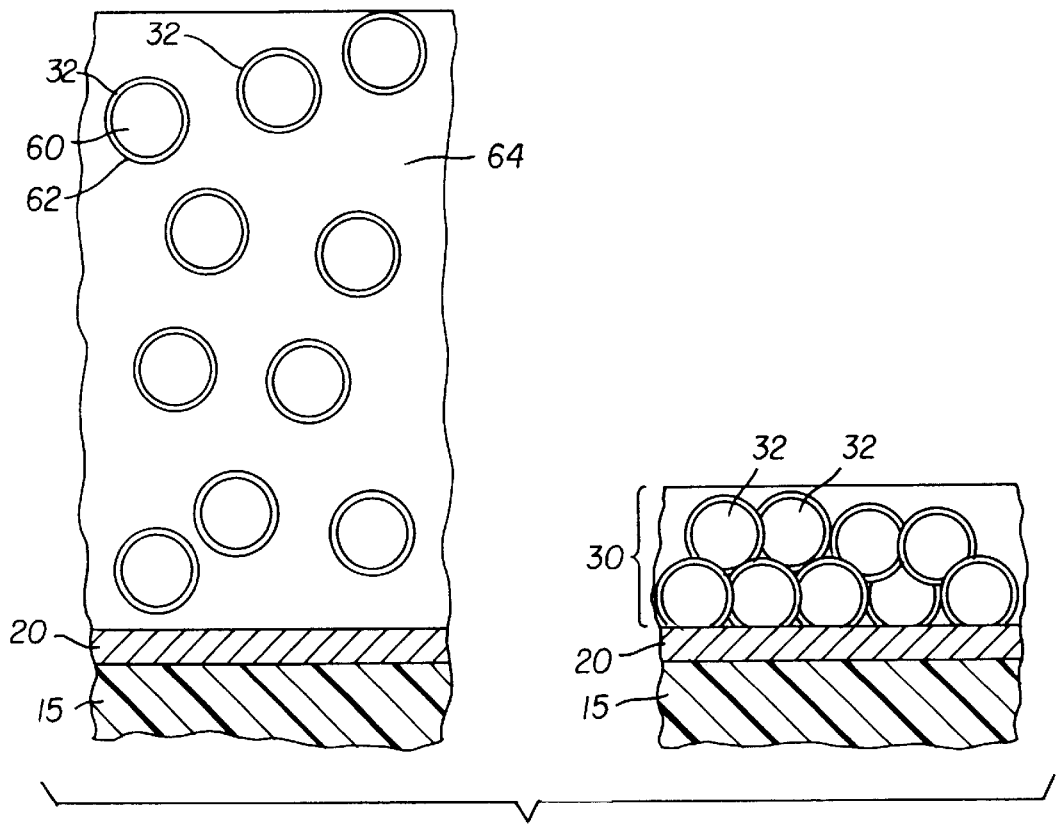
FIG. 4 is a sectional view of a process for forming polymer dispersed cholesteric liquid crystal in accordance with first prior art.

FIG. 4 is a sectional view of a process for forming polymer dispersed cholesteric liquid crystal in accordance with first prior art found in U.S. Pat. No. 3,578,844. Cholesteric liquid crystal is first emulsified in a water-soluble polymer solution comprising gelatin, which is precipitated on the surface of domains 32 by a change in pH. Cholesteric liquid crystal 60 has encapsulation material 62 formed around each domain 32. The encapsulated cholesteric liquid crystal domains 32 are suspended in a solution 64. Solution 64 can contain a dissolved binder. Prior art discloses coating the suspended domains 32 in solution 64 onto a substrate 15 having first conductors 20. After drying, light modulating layer 32 consists of encapsulated spherical domains 32. The polymer dispersed cholesteric layer 30 formed by such processes are spherical, and have lower reflectance per deposited gram per unit area of material than a continuous layer of the cholesteric material or a layer of cholesteric material with flattened domains.

Figure 5:
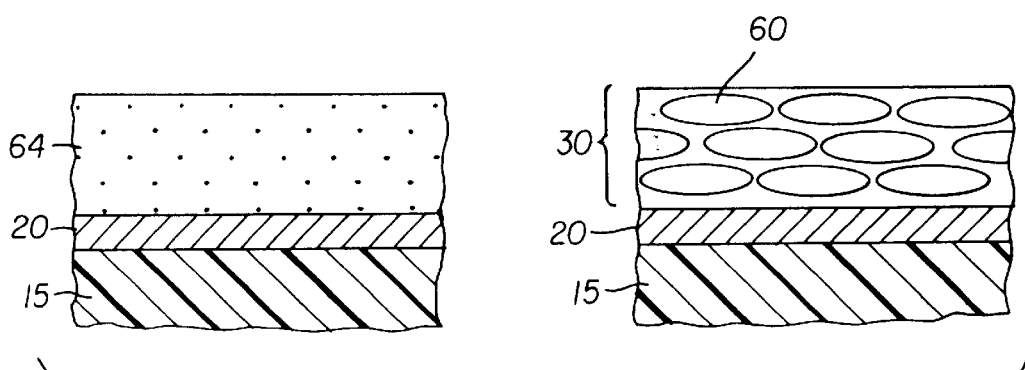
FIG. 5 is a sectional view of a process for forming polymer dispersed cholesteric liquid crystal in accordance with second prior art.

FIG. 5 is a sectional view of a process for forming polymer dispersed cholesteric liquid crystal in accordance with second prior art found in U.S. Pat. No. 4,673,255. A homogenous solution of liquid crystal and monomer is coated over first conductor 20. A solution can be present in the solution for certain of the film forming processes. The coating is subjected to one of several methods to phase separate the liquid crystal from the polymer to provide polymer dispersed cholesteric layer 30 having polymer dispersed cholesteric domains 60 shown on the right of their drawing. Polymer formation processes include heating, solvent or polymerization techniques to precipitate a polymer out of the polymer-cholesteric solution. In all processes, the liquid crystal material and the polymer start as solution. The polymerization process can be lengthy, environmentally unfriendly, and requiring precise process control.

Figure 6:
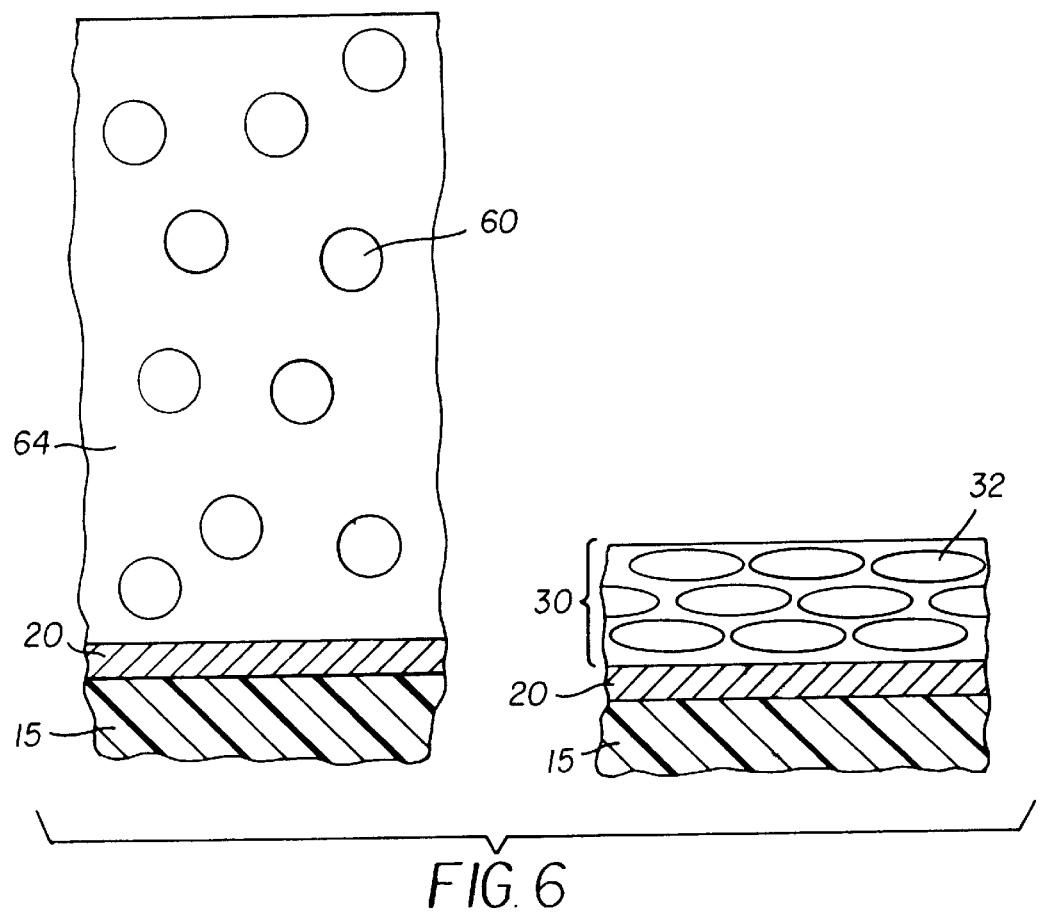
FIG. 6 is a sectional view of a process for forming polymer dispersed cholesteric liquid crystal in accordance with the present invention.

FIG. 6 is a sectional view of a process for forming polymer dispersed cholesteric liquid crystal in accordance with the present invention. Cholesteric liquid crystal 60 is emulsified into domains 60 suspended in water containing a dissolved polymer. In the present invention, the soluble polymer comprises gelatin. Although it has been found that many water soluble polymers such as gelatin, gum-arabic and poly vinyl alcohol are insoluble in the cholesteric liquid crystal mixture, gelatin has the advantageous property of changing viscosity rapidly with near-ambient temperature changes. Gelatin solutions used in the coating comprise between 2 and 15, preferably between 3 and 10 weight percent gelatin in solution. That weight percent solution provides a low viscosity, typically below 30 centipoise viscosity when the solution is heated to a temperature between 30 and 50 degrees centigrade. The viscosity of such a gelatin solution is high, above 200 centipoise, when chilled to a temperature between 0 and 20 degrees centigrade. As mentioned above, common surfactants can be added at a concentration equal to the critical micelle concentration to make the emulsion coat evenly during the coating process.

In order to liquefy the emulsion, the temperature is raised above 35° C. See Edwin Gutoff, *Coating and Drying Defects* (John Wiley & Sons Copyright 1995), pages 144 and 145. Gutoff states that the temperature of the emulsion should be isothermal as much as possible throughout the process to minimize coating non-uniformities. In order to robustly coat this emulsion, the weight percent solution used in this invention provides a low viscosity, typically below 30 centipoise viscosity when the solution is heated to a temperature between 30 and 50 degrees centigrade.

In one embodiment, a liquid crystal material is dispersed in an aqueous bath containing a water-soluble binder material by the methods disclosed in coassigned EP 1 116 771 A2, hereby incorporated by reference in its entirety. The liquid crystal and gelatin emulsion are coated to achieve a dry thickness of between 5 and 30 microns to optimize the optical properties of the light-modulating layer. The coating thickness, size of the liquid crystal domains, and concentration of the domains of liquid crystal materials can be designed for optimum optical properties. The dispersion of liquid crystals can be performed using shear mills or other mechanical separating means to form domains of liquid crystal within the light-modulating layer. By varying the formulation, homogenization devices (sonification and rotor-stator mixer) produce emulsions of different droplet size.

In a preferred embodiment, disclosed in the above-mentioned EP 1 116 771 A2, a method referred to as "limited coalescence" is used to form uniformly sized emulsions of liquid crystalline material. For example, the liquid crystal material can be homogenized in the presence of finely divided silica, a coalescence limiting material, such as LUDOX® from DuPont Corporation. A promoter material can be added to the aqueous bath to drive the colloidal particles to the liquid—liquid interface. In a preferred embodiment, a copolymer of adipic acid and 2-(methylamino)ethanol can be used as the promoting agent in the water bath. The liquid crystal material can be dispersed using ultrasound to create liquid crystal domains below 1 micron in size. When the ultrasound energy is removed, the liquid crystal material coalesces into domains of uniform size. Preferably, the ratio of smallest to largest domain size varies by approximately 1:2. By varying the amount of silica and copolymer relative to the liquid crystalline material, uniform domain size emulsions of the desired average diameter (by microscopy), for example 3 or 8 micron, can be produced. These emulsions can be diluted into gelatin solution for subsequent coating. The limited coalescent materials can be coated using a photographic emulsion coating machine onto sheets of polyester having an ITO coating with a sheet conductivity of 160 ohms per square. The coating can be dried to provide a 9 micron thick polymerically dispersed cholesteric coating. By using limited coalescence, there are few, if any, parasitic smaller domains (having undesirable electro-optical properties) within the dried coatings.

The coatable liquid-crystal-containing composition of the invention can be applied by any of a number of well known techniques, such as dip coating, rod coating, blade coating, air knife coating, gravure coating and reverse roll coating, extrusion coating, slide (or bead) coating, curtain coating, and the like. After coating, the layer is generally dried by simple evaporation, which may be accelerated by known techniques such as convection heating or impingement of forced air, at a temperature and rate that will not soften the emulsion at any given water concentration of the drying emulsion. Known coating and drying methods are described in further detail in *Research Disclosure* No. 308119, Published Dec. 1989, pages 1007 to 1008. The coating is preferably dried by the impingement of air at a temperature and humidity that maintains the high viscosity of the gel state of the dispersing phase, thereby preventing remelting of the gelatin matrix and softening of the gelatin such that damage to the coating occurs. The coating is maintained below the melt temperature during drying. The melt temperature is the temperature at which the set coating will turn back into liquid form. If remelt occurs, air flow within the dryer can disturb the coating and, in severe cases of remelt, the coating liquid can trackoff within the machine, requiring the machine to be shutdown for cleaning.

In the preferred embodiment, immediately after the emulsion is coated on a substrate, the emulsion temperature is rapidly lowered from about 40° C. to about 10° C. in a chilling section. The lowering of emulsion temperature changes the state of the coated emulsion from a liquid to a semi-solid gel. The chilling of the emulsion permits, in the preferred embodiment, the emulsion to travel through a series of warm air impingement dryers with no disruption to the coating. The chilling of the emulsion also allows the emulsion and substrate to travel over a series of rollers as it conveys through the machine. In a preferred commercial embodiment, the substrate to be coated is in the form of a moving web. The speed of the moving web is a function of the length of the chill box and the length of the dryer. The high polymeric content of the coated material permits the dried and coated web to be wound on a roll. Thus, in a commercial operation, the coated substrate can be passed over rollers during the drying process, and once dried, wound on cores. After completing the manufacture of a coated liquid-crystal sheet material between spaced electrodes, the sheet material can be cut into a plurality of smaller, individual areas for use in various display or other applications.

During the drying operation, as water evaporates, the coated emulsion thickness reduces in size. The concentration of gelatin polymer in the emulsion is limited to viscosity ranges that can be wet coated onto second conductors 22. Typically, the gelatin concentration must be less than 10 percent to be slot coated. The gelatin concentration must also be high enough that the chilled emulsion has enough hardness in the chilled state to be dried by air impingement and not be affected by contact with rollers. In practice the gelatin concentration must be greater than 2 percent to chill set, preferably less than 15%, preferably about 3 to 10%. Liquid crystal concentration relative to gel concentration improves reflectance per weight laydown of cholesteric material as liquid crystal concentration goes up relative to gelatin concentration. However, the mechanical strength of the polymer dispersed cholesteric layer goes down as the amount of polymer is reduced. Useful liquid crystal to gelatin ratios should be between 6:1 and 0.5:1 liquid crystal to gelatin, preferably 8:5. For pressure insensitive compositions, the ratio of liquid crystal to gelatin, by weight percent, is preferably less than 5 to 1, more preferably less than 4 to 1, most preferably less than 3 to 1, optimally less than 2 to 1. It is difficult to rapidly chill set and dry compositions having a ratio greater than 3:1.

As water evaporates during drying, the coated emulsion thickness reduces in size. Within the usable concentration ranges, water removed during drying is significant, typically between 80 and 95 percent. The water loss reduces the height of wet-coated polymer dispersed cholesteric layer 30 for a given width. The wet to dry thickness ratio is typically a factor of between 3:1 and 10:1. Suitably, the wet coating is 10 to 150 microns when first coated and 2 to 20 microns when dried.

The resulting domains are flattened spheres and have on average a thickness substantially less than their length, preferably at least 50% less. More preferably, the domains on average have a thickness (depth) to length ratio of 1:2 to 1:6. The flattening of the domains can be achieved by proper formulation and sufficiently rapid drying of the coating.

The invention of the present invention is not limited to cholesteric displays. In a broader aspect, the present method is directed to the making of a display having polymer-dispersion of any electro-optical fluid, comprising the steps of (a) providing an emulsion comprising an electro-optical fluid, having a plurality of optical states responsive to electric fields, dispersed in a gelatin solution; (b) heating the emulsion to reduce the viscosity of the emulsion; (c) coating the heated emulsion onto a substrate having a field carrying layer on its surface; (d) lowering the temperature of the coating to change the state of the dispersing phase from a liquid to a gel state characterized by a corresponding increased-viscosity state; and (e) drying the coating, while maintaining it in the increased viscosity state, to form a coating comprising domains of said electro-optical fluid dispersed in a dried gelatin-containing matrix. The electro-optical fluid can be selected from the group consisting of liquid crystals and electrophoretic materials. A variety of electronic display devices operate by the principle of electrophoresis. In such displays, an electrophoretic suspension contains electrophoretically mobile particles, such as disclosed in U.S. Pat. No. 6,327,072 B1, assigned to E Ink Corporation, which patent is hereby incorporated by reference in its entirety.

In one embodiment, an electrophoretic display device comprises cells that contain one or more species of electrophoretically mobile particles dispersed in a dyed suspending fluid. Another example is a system in which the cells contain two separate species of particles suspended in a clear suspending fluid, in which one species of particle absorbs light (dark), while the other species of particle scatters light (white). There are other extensions (more than two species of particles, with or without a dye, etc.). The particles are commonly solid pigments, dyed particles, or pigment/polymer composites. A neat pigment can be any pigment, and, usually for a light colored particle, pigments such as rutile (titania), anatase (titania), barium sulfate, kaolin, or zinc oxide are useful. Some typical particles have high refractive indices, high scattering coefficients, and low absorption coefficients. Other particles are absorptive, such as carbon black or colored pigments used in paints and inks. The pigment should also be insoluble in the suspending fluid. Yellow pigments such as diarylide yellow, hansa yellow, and benzidin yellow have also found use in similar displays. Any other reflective material can be employed for a light colored particle, including non-pigment materials, such as metallic particles.

Preferably, however, the electro-optical fluid used in the present method is a liquid crystal material, preferably one selected from the group consisting of chiral nematic (cholesteric) liquid crystals, nematic liquid crystals, and ferroelectric liquid crystals. A variety of liquid crystal materials are disclosed by Collings, Peter J. et al., *Introduction to Liquid Crystals* (Taylor&Francis Ltd. 1997) and Drziac, Paul S., *Liquid Crystal Dispersions* (World Scientific 1998), both hereby incorporated by reference. Chiral nematic liquid crystal materials are particularly preferred.

Another aspect of the present invention relates to a light modulating, electrically responsive sheet comprising a substrate, an electrically conductive layer formed over the substrate, and a light modulating layer comprising an electro-optical fluid, preferably a chiral nematic material, disposed over the electrically conductive layer formed by the above described methods.

EXAMPLE

Figure 7:
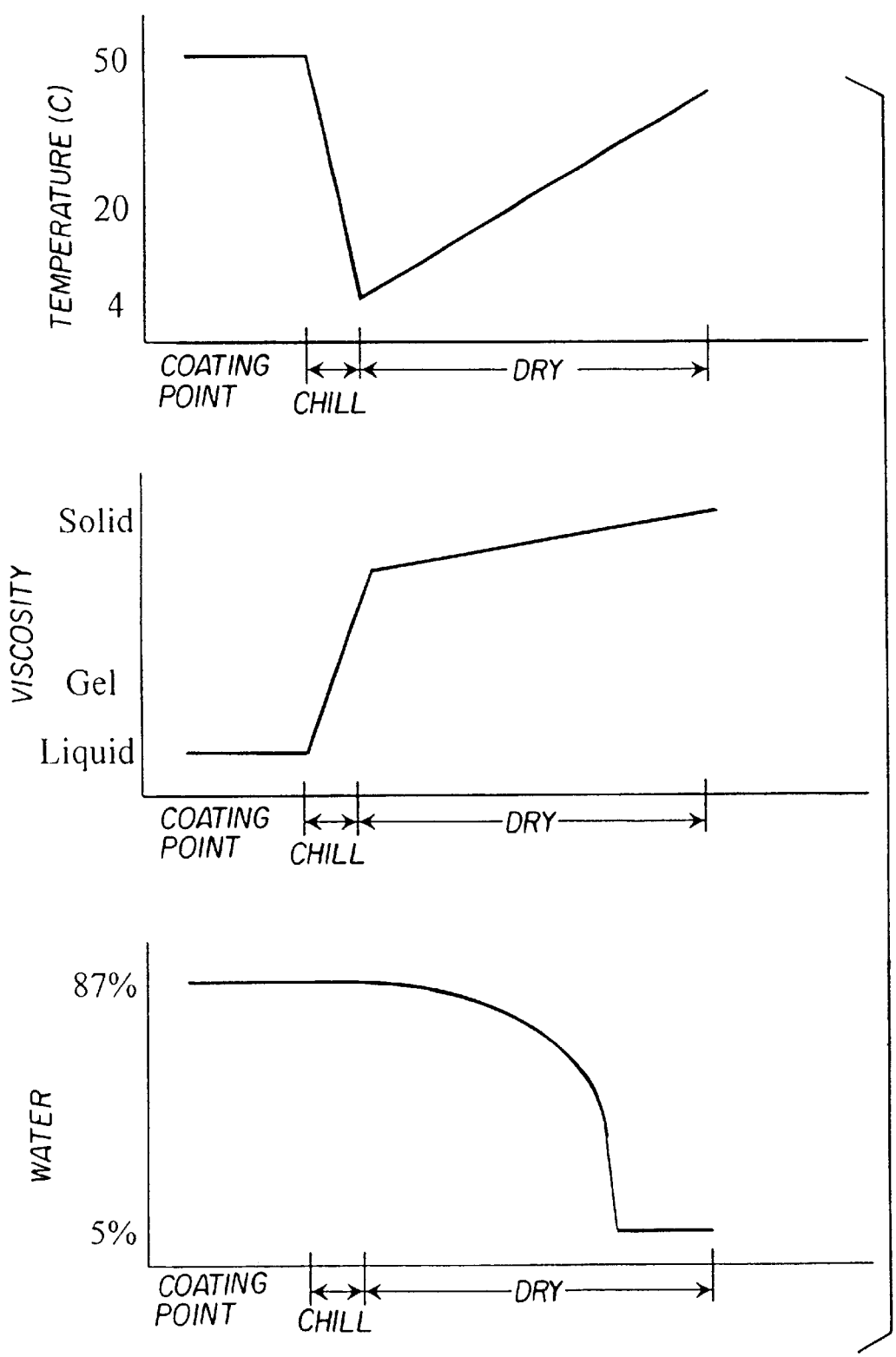
FIG. 7 is a process schedule for forming a polymer dispersed cholesteric liquid crystal in accordance with the present invention.

An experiment was performed to provide polymer dispersed cholesteric liquid crystal domains. An emulsion was provided with cholesteric oil domains with a mean diameter of 10 microns dispersed and comprising 8% weight percent of a 5% gelatin solution. FIG. 7 is a process schedule for forming a polymer dispersed cholesteric liquid crystal in accordance with the present example of the invention. The emulsion was heated to 40 degrees centigrade, which reduced the viscosity of the emulsion to 20 centipoise. A 125 micron polyester substrate 15 having an ITO conductive layer was continuously coated with the heated emulsion at 8.5 cc per square foot on a photographic coating machine. The machine speed was set so that the emulsion temperature was reduced to 10 degrees centigrade in a first chill section of the machine. The viscosity of the emulsion increased so that the coating viscosity changed from a liquid state to a very high-viscosity gel state. The emulsion chill-set hard enough to allow both warm impingement air and the ability to be passed over roller sets in drying areas of the photographic coating equipment to remove the bulk of the water content of the emulsion. The resulting coating was about 9 microns thick and had stacked layers of flattened domains of cholesteric liquid crystal dispersed in a gelatin polymeric matrix.

Figure 8:
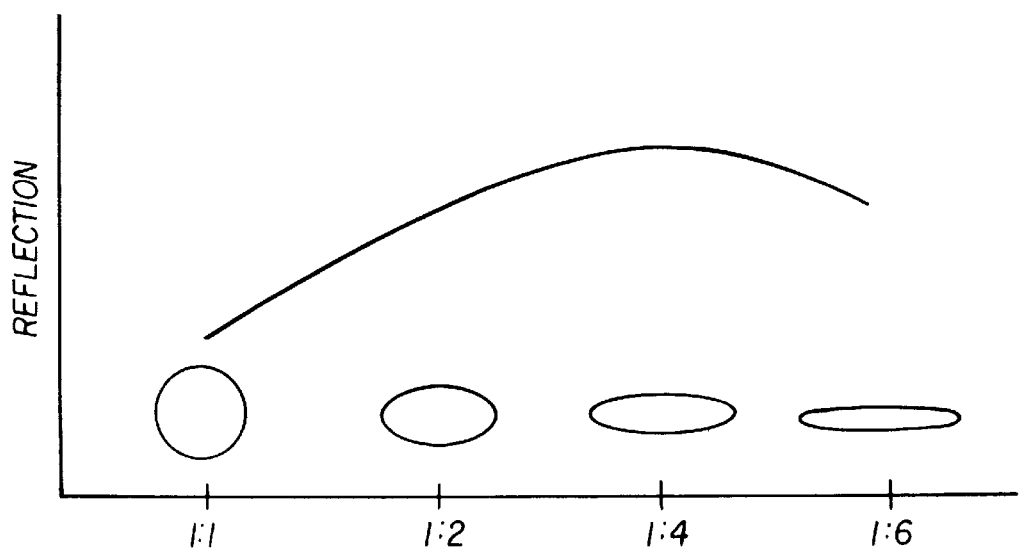
FIG. 8 is a plot of reflection verses domain geometry in accordance with the present invention.

The resulting domains were about 4 microns thick and 16 micron in diameter. Research has shown that improvements in reflectance per thickness of liquid crystal cease after about a 4 micron layer thickness of cholesteric material. The 4 micron domain thickness produced by the photographic machine coating produces flattened domains of near optimal flatness. FIG. 8 is a plot of reflection verses domain geometry in accordance with the present invention. The diagram plots the reflectance for a given weight laydown for liquid crystal domains of various flatness. Spherical domains have a given reflectance, which increases as the domains get flatter. When domains get above a 4:1 depth to thickness ratio, reflectance is reduced due to optical effects from excessive thinning of the cholesteric material.

The experiment showed that the optimized material structure of the emulsion produces near-optimum flattened domain structures within polymer dispersed cholesteric layer 30. Chilling the gelatin dispersion before drying permitted the water-laden coating to cope with both warm impingement air and be passed over rollers in the drying area of the film coating. Drying parameters exist that permit the drying of the emulsion without damage to either the emulsion or damage to the photographic coating machinery.

The invention has been described in detail with particular reference to certain preferred embodiments thereof, but it will be understood that variations and modifications can be effected within the spirit and scope of the invention.

Parts List 10 sheet
15 substrate
20 first conductor
22 second conductor
30 polymer dispersed cholesteric layer
32 domains
40 incident light
42 reflected light
60 Cholesteric liquid crystal
62 encapsulation material
64 solution
72 planar liquid crystal
74 focal conic liquid crystal

What is claimed is:

1. A method of making a liquid-crystal sheet material, useful for displays, having polymer-dispersed cholesteric liquid crystals, comprising the steps of:

(a) providing an emulsion having cholesteric liquid crystal material dispersed in a gelatin solution;

(b) heating the emulsion to reduce the viscosity of the emulsion;

(c) coating the heated emulsion onto a substrate have a patterned electrode on its surface;

(d) lowering the temperature of the coated emulsion to change the state of the coated emulsion from a liquid to a gel state, thereby forming a coating characterized by a corresponding increased-viscosity state; and (d) drying the coating, while maintaining it in the increased viscosity state, to form a coating in which domains of cholesteric liquid crystals are dispersed in a dried gelatin-containing matrix.

2. The method of claim 1 wherein the emulsion includes a surfactant.

3. The method of claim 1 wherein the emulsion in step (b) is heated within a temperature range of between 20 and 50° C.

4. The method of claim 1 wherein in step (c) the temperature of the emulsion in step (d) is lowered to be in the range of 5 and 20° C.

5. The method of claim 1 wherein the gelatin concentration in the wet emulsion when coated is between 2 and 15 weight percent.

6. The method of claim 5 wherein the gelatin concentration in the wet emulsion when coated is between 3 and 10 percent.

7. The method of claim 1 wherein the ratio of cholesteric liquid crystal to gelatin in the emulsion is between 6:1 and 0.5:1.

8. The method of claim 1 wherein the ratio of cholesteric liquid crystal to gelatin in the emulsion is between 3:1 and 1:1.

9. The method of claim 1 wherein the domains thus formed are flattened to improve reflectance in the reflective optical state of the display.

10. The method of claim 1 wherein between 80 and 95 percent by weight of water in the emulsion is removed from the coated emulsion during drying in step (e) and wherein the wet to dry thickness ratio is between 3:1 and 10:1.

11. The method of claim 1 wherein the domains in the dried coating of step (e) has an average diameter of 2 to 30 microns.

12. The method of claim 1 wherein the resulting domains are flattened spheres and have on average a thickness at least 50% less than their length.

13. The method of claim 12 wherein the domains have a thickness to length ratio of 1:2 to 1:6.

14. The method of claim 1 wherein the emulsion is coated over patterned ITO conductors in step (c).

15. The method of claim 1 wherein the substrate is a flexible plastic material.

16. The method of claim 1 wherein the substrate comprises a polycarbonate or polyester material.

17. The method of claim 1 wherein the wet coating is 10 to 150 microns when first coated and 2 to 20 microns when dried.

18. The method of claim 1 wherein, after step (d), second conductors are formed, using printed inks, over the dried coating.

19. The method of claim 1 wherein the coating is dried in step (d) by the impingement of air at a temperature and humidity that maintains the increased-viscosity state of the coating, thereby preventing remelting or softening of the gelatin matrix such that damage to the coating occurs.

20. The method of claim 1 wherein the substrate is transported over rollers during the drying process.

21. The method of claim 1 wherein the substrate being coated is a moving web and, after completing the manufacture of sheet material including spaced electrodes over each side of the coating, the sheet material is cut into a plurality of individual areas for use in displays.

22. A method of making a liquid crystal sheet material, for use in a display, having polymer-dispersed cholesteric liquid crystals, comprising the steps of:

(a) providing an emulsion comprising cholesteric liquid crystal material dispersed in a gelatin solution;

(b) heating the emulsion to reduce the viscosity of the emulsion;

(c) coating the heated emulsion onto a substrate having a patterned electrode on its surface;

(d) lowering the temperature of the coated emulsion to change the state of the coated emulsion from a liquid to a gel state, thereby forming a coating characterized by a corresponding increased-viscosity state; and (e) drying the coating, while maintaining it in the increased-viscosity state, wherein between 80 and 95 percent by weight of water in the emulsion is removed from the coated emulsion during drying and wherein the wet to dry thickness ratio is between 3:1 and 10:1;

thereby forming a coating in which domains of cholesteric liquid crystals are dispersed in a dried gelatin-containing matrix, wherein the domains have an average diameter of 2 to 30 microns and are flattened so that the average ratio of thickness to length is 1:2 to 1:6, wherein the coating is capable of providing two stable states, a light-transmissive state and a light-reflecting state for providing image modulation in a display.

23. A method of making a sheet material, for use in displays, comprising a polymer-dispersed electro-optical fluid, which method comprises the steps of:

(a) providing an emulsion comprising an electro-optical fluid, having a plurality of optical states responsive to electric fields, dispersed in a gelatin solution;

(b) heating the emulsion to reduce the viscosity of the emulsion;

(c) forming a coating the heated emulsion on a substrate having a field carrying layer on its surface;

(d) lowering the temperature of the coating to change the state of the dispersing phase in the coating from a liquid to a gel state characterized by a corresponding increased-viscosity state; and (e) drying the coating, while maintaining it in the increased-viscosity state, wherein between 80 and 95 percent by weight of water in the emulsion is removed from the coated emulsion during drying and wherein the wet to dry thickness ratio is between 3:1 and 10:1;

thereby forming a coating in which domains of said electro-optical fluid are dispersed in a dried gelatin-containing matrix, wherein the coating is capable of providing two stable states a light-transmissive state and a light-reflecting state for providing image modulation in a display.

24. The method of claim 23 wherein electro-optical fluid is selected from the group consisting of a liquid crystal material and an electrophoretic material.

25. The method of claim 24 wherein the liquid crystal material is selected from the group consisting of chiral nematic liquid crystals, nematic liquid crystals, and ferro-electric liquid crystals.

26. A light modulating, electrically responsive sheet comprising:

(a) a substrate;

(b) an electrically conductive layer formed over the substrate;

(c) a light modulating layer disposed over the electrically conductive layer formed by the method of claim 23.

* * * * *

UNITED STATES PATENT AND TRADEMARK OFFICE
CERTIFICATE OF CORRECTION

PATENT NO.  : 6,704,073 B2
DATED       : March 9, 2004
INVENTOR(S) : Stephenson et al.

It is certified that error appears in the above-identified patent and that said Letters Patent is hereby corrected as shown below:

Column 5,
Line 23, delete "1008,585" and replace with -- 10/085,851 --.

Column 10,
Line 66, after "onto a substrate" delete "have" and replace with -- having --.

Column 11,
Line 5, delete "(d) drying the coating" and replace with -- (e) drying the coating --.
Line 5, after "coating," and before "while" insert -- wherein between 80 and 95 percent by weight of water in the emulsion is removed from the coated emulsion during drying and wherein the wet to dry thickness ration is between 3:1 and 10:1; --.
Line 6, delete "to form" and replace with -- thereby forming --.
Line 8, after "gelatin-containing matrix" insert -- which coating is capable of providing two stable states, a light-transmissive state and a light-reflecting state for providing image modulation in a display. --.
Lines 32-35, delete (all of claim 10).
Line 57, delete "step (d)" and replace with -- step (e) --.

Signed and Sealed this

First Day of November, 2005

JON W. DUDAS
*Director of the United States Patent and Trademark Office*